Figure 1:
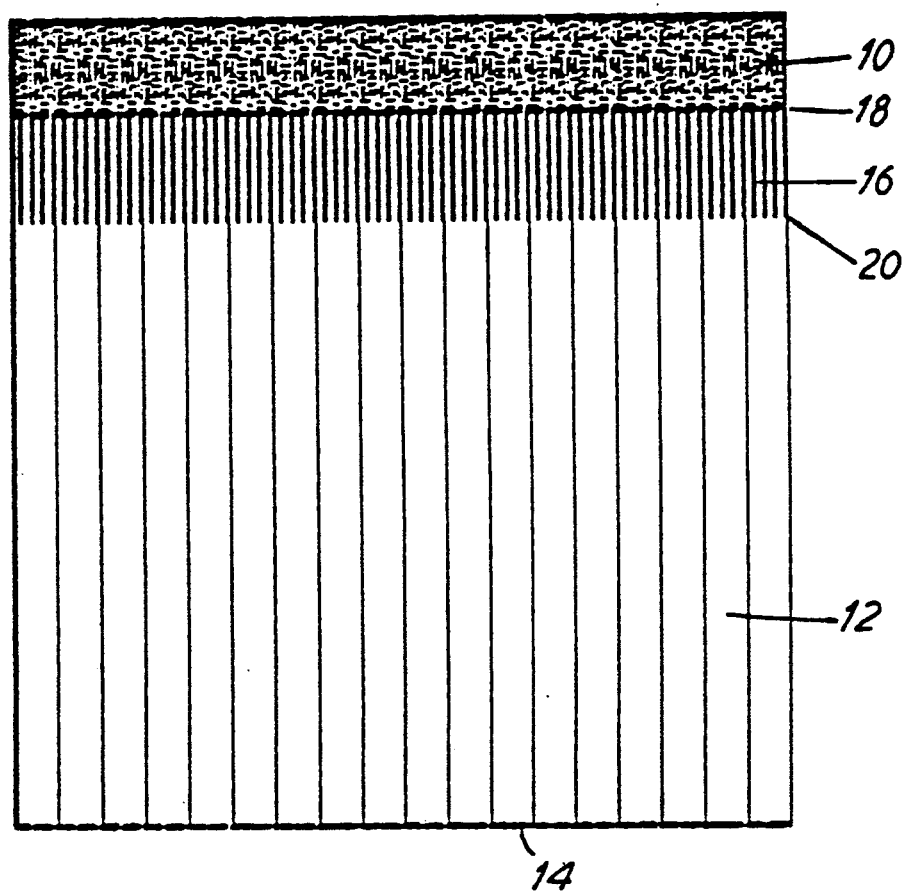

United States Patent [19]
Butler et al.

[11] Patent Number: 5,137,634
[45] Date of Patent: * Aug. 11, 1992

[54] COMPOSITE MEMBRANE

[75] Inventors: Ernest P. Butler, Wroxton; Rowena R. Landham, Solihull; Michael P. Thomas, Banbury, all of England

[73] Assignee: Alcan International Limited, Montreal, Canada

[*] Notice: The portion of the term of this patent subsequent to May 1, 2007 has been disclaimed.

[21] Appl. No.: 515,054

[22] Filed: Apr. 26, 1990

Related U.S. Application Data

[63] Continuation of Ser. No. 39,619, Apr. 16, 1987, Pat. No. 4,938,870.

[30] Foreign Application Priority Data

Apr. 16, 1986 [GB] United Kingdom ............... 8609248
Feb. 24, 1987 [GB] United Kingdom ............... 8704252

[51] Int. Cl.$^5$ ............................................ B01D 71/04
[52] U.S. Cl. .................. 210/490; 210/500.25; 210/500.26
[58] Field of Search ............ 210/490, 500.25, 500.26, 210/570.1, 496; 55/16, 158; 427/245, 246

[56] References Cited

U.S. PATENT DOCUMENTS 4,921,823  5/1990  Furneaux et al. ............... 502/4

FOREIGN PATENT DOCUMENTS 1071804  4/1986  Japan ..................... 210/500.25
8303079  4/1985  Netherlands ............. 210/500.25

*Primary Examiner*—Frank Spear
*Attorney, Agent, or Firm*—Cooper & Dunham

[57] ABSTRACT

A composite sheet comprises a porous inorganic membrane and a microporous inorganic film overlying a surface of the membrane, where the membrane may be an anodic aluminium oxide membrane having an average pore diameter of 5 to 100 nm, and the microporous film is of substantially uniform pore size and substantially free of cracks and pinholes. The film may be formed by applying a colloidal sol of an aluminium alkoxide, or a solution of a polymeric precursor of a titanium oxide, to a surface of the membrane to form thereon a gel layer, and drying and heating the gel to convert it to a microporous inorganic film.

21 Claims, 2 Drawing Sheets

COMPOSITE MEMBRANE

This is a continuation of application Ser. No. 039,619, filed Apr. 16, 1987, now U.S. Pat. No. 4,938,870.

This invention is concerned with composite membranes which are suitable for separation and filtration processes in the ultrafiltration range. Ultrafiltration is generally accepted to be defined by retention of molecules or particles in the size range 20 nm down to 1 nm (1 nm = 1 nanometer = $10^{-9}$ m). An alternative way of expressing this filtation range is by converting molecular size to molecular weight: on this basis it is the retention of species in the molecular weight range of 300,000 down to 300. The main requirements for ultrafilitration membranes are:

Available in suitable size and shape, and sufficiently robust to resist accidental damage;

Resistant to chemicals and heat of the kind likely to be encountered in filtration processes. In this respect, inorganic membranes are generally superior to organic ones.

A rather uniform pore size. Here again, current polymeric organic ultrafiltration membranes have rather wide pore size distributions; as a result their selectivity is low and their molecular weight cutoff is not sharp.

Substantial or ideally complete freedom from cracks or pin-holes.

Having regard to pore size, a high flux (defined as volume passing per unit area per unit time), to permit rapid passage of filtrate. This feature requires not only a large number of pores per unit area, but also that the length of the narrow pores be as short as possible.

U.S. Pat. No. 3,944,658 describes a sol-gel technique for making a porous alumina product. An aluminium alkoxide is hydrolysed in water and peptised with acid to form a clear transparent sol. The sol is gelled and the gel dried and calcined to provide the porous product. It is noted that the sol can be applied as a coating to porous ceramic materials, but this aspect is not further described.

Japan Kokai 60-180979 describes a method of manufacturing a ceramic membrane for separating condensation components. A porous support structure is repeatedly impregnated with an alumina sol, dried and fired, to give a product with fine pores down to about 1 nm diameter.

A. F. M. Leenaars and co-workers at Twente University of Technology in Holland have published a series of papers on alumina films produced by sol-gel techniques. An article in Journal of Colloid and Interface Science, vol 105, May 1, 1985, 27 to 39 describes the formation of composite membranes by applying alumina sols to porous alpha-alumina supports. The supports were dipped into the sol for short periods, typically 0.5 seconds and removed, dried and calcined. Calcined layer thicknesses varied from 3 to 8 microns, but crack-free films could only be obtained with layers less than 5 microns. The thinnest layers could only be obtained by very short dipping times when thicknesses were largely uncontrolled and highly variable, i.e. plus or minus 0.5 microns. Significant impregnations of the support by the sol generally took place on dipping.

Articles in Journal of Membrane Science, 24 (1985) pages 245-260 and 261-270 describe the use of such composite membranes in experiments to determine their permeability for pure liquids and their ultrafiltration and hyperfiltration properties. The sol-gel films tested were, after calcining, from 2.5 to 5.5 microns thick, as a result of which low fluxes were generally obtained. Some pin-holing was present in the films, as a result of which fluxes were in isolated cases larger.

As they stand, the products described in these articles would not be suitable for use as ultrafiltration membranes. It is an object of this invention to overcome these problems and provide composite membranes suitable for use in ultrafiltration.

In one aspect, the invention provides a composite sheet comprising a porous inorganic membrane and a microporous inorganic film overlying a surface of the membrane, which microporous inorganic film is of substantially uniform pore size and substantially free of cracks and pinholes. The porous inorganic membrane may be of alumina, preferably a porous anodic aluminium oxide membrane, which may be symmetric or asymmetric. The porous inorganic membrane may preferably have an average pore diameter of 5 to 100 nm at the surface overlain by the film. The microporous inorganic film preferably has a substantially uniform thickness of from 0.01 to 2.0 microns.

In another aspect, the invention provides a method of making this composite sheet, which method comprises providing a porous inorganic membrane, applying a colloidal sol of an inorganic material or a solution of a polymeric precursor to an inorganic material to a surface of the membrane so as to form a gel layer thereon, and drying and heating the gel to convert it to a microporous inorganic film of substantially uniform pore size and substantially free of cracks and pinholes. The surface of the membrane is preferably pre-treated with a solution of a silicate, borate or phosphate.

Conventional anodic aluminium oxide membranes are symmetric, with generally cylindrical pores extending straight through. These are suitable for use in the invention, but particular advantages can accrue if the membrane is asymmetric.

A suitable asymmetric porous anodic aluminium oxide membrane is described in European Patent Specification 178831. This membrane has a system of larger pores extending in from a first face, which larger pores may have a diameter (near their inner ends) of some 10 nm to 2 microns at a length of from 0.1 to 100 microns; and a system of smaller pores extending in from a second face, the smaller pores having a substantially uniform minimum diameter of at least 2 nm and preferably 5 to 100 nm but less than half the diameter of the larger pores. The anodic membrane can be made as thick as is desired to provide adequate mechanical strength for the composite membrane. The anodic membrane has a rather large number of pores per unit area, and these extend generally perpendicular to the face to which they lead. The region of minimum pore diameter of the smaller pores is at or close to the second face of the membrane.

The inorganic membrane may be a refractory membrane. Overlying a face of the membrane is a microporous film of an inorganic material which may be refractory, for example a ceramic oxide. It is envisaged that this may be an oxide of aluminium, titanium, zirconium, silicon, tantalum, cerium, hafnium, yttrium, thorium, tin, germanium, indium vanadium, niobium, iron, chromium, cobalt, boron and combinations thereof.

The thickness of the microporous film is preferably substantially uniform over the surface of the membrane, preferably from 0.01 to 2.0 microns, particularly from 0.03 to 0.5 microns. The thicker the microporous film the lower is the liquid flux obtainable through it on ultrafiltration, and for this reason a preferred maximum limit is set at 2 microns.

The films contain pores of substantially uniform pore size and substantially free of cracks and pinholes. The average pore size is preferably from 0.5 to 30 nm, particularly 1 to 4 nm, and pores more than twice the average size are preferably substantially absent.

The method of the invention involves applying a colloidal sol of an inorganic material (such as a ceramic oxide) or a solution of a polymeric percursor to an inorganic material (such as a metal oxide) to one or both faces of the membrane. The colloidal sol may be derived by known means from an inorganic oxide powder, such as an oxide of the elements mentioned above. More preferably the colloidal sol or polymeric solution is derived by hydrolysis of a metal alkoxide. For example, boehmite sols may be prepared using the procedure described in U.S. Pat. No. 3,944,658. According to this procedure, an aluminium alkoxide is hydrolysed in an excess of water maintained at 80° C., and subsequently peptized with an acid, to form a clear transparent sol. The sol consists of colloidal particles of stable crystalline aluminium monohydrate, AlO(OH), dispersed in the aqueous phase. The sol so produced typically contains about 30 gl$^{-1}$ of aluminium values expressed as $Al_2O_3$, and can be adjusted to the desired concentration for coating by dilution with water or evaporation. Coatings may be achieved with sols of concentration up to 190 gl$^{-1}$, preferably 10 gl$^{-1}$ to 90 gl$^{-1}$, of aluminium values expressed as $Al_2O_3$. As an alternative example, —Ti—O—Ti— polymer solutions may be prepared using a procedure similar to that described in the article by C J Brinker and M S Harrington in Solar Energy Materials, 1981, volume 5, 159-172, wherein a titanium alkoxide is partially hydrolysed in an alcoholic solution at room temperature in the presence of an acid catalyst to form a stable —Ti—O—Ti— polymer solution. The solution so produced typically contains about 10 to 30 gl$^{-1}$ of titanium values expressed as $TiO_2$, and can be adjusted to the desired concentration for coating by evaporation of solvent or further dilution with alcohol. The sol or solution can be applied to the anodic oxide membrane in the freshly concentrated state, or aged to increase its viscosity prior to application. Control over the film thickness in the composite membrane can be achieved in part by control over the concentration and viscosity of the sol prior to application.

Prior to sol deposition, it may be advantageous to pre-treat the membrane, particularly an anodic aluminium oxide membrane or other inorganic membrane, by immersion in a solution of a silicate, phosphate or borate. The effect of this pre-treatment can be to permit the subsequent formation of a gel layer giving substantially complete coverage of the membrane more easily than is possible without the pre-treatment. The mechanism by which this desirable effect is achieved is not fully understood, but the pretreatment may improve the wettability of the membrane surface, and may deposit on or react with the surface to form a layer which is receptive to the sol and helps to gel it. The solution may be, in order of decreasing preference, an aqueous solution of an alkali metal metasilicate such as sodium metasilicate, an alkali metal triphosphate particularly pentasodium triphosphate, or an alkali metal borate such as disodium tetraborate. The concentration is preferably from 1% up to saturation, typically in the range 3 to 5 percent by weight. The temperature may be ambient such as from 10° to 30° C. The period of immersion of the membrane in the solution is generally in the range 1 second to 10 minutes, and may typically be around 5 seconds. Immersion time needs to be adjusted, in relation to the other process variables, to be sufficient to modify the surface of the membrane, but not so great as to deposit substantial amounts of material in a way that might reduce the diameter of the pores or even block them completely. This should be followed by rinsing the membrane in distilled water.

Addition of a surface active agent to the sol prior to application aids the formation of thin uniform gel layers. Non ionic surfactants such as Nonidet (Octylphenyl ethylene oxide condensate supplied by BDH Chemicals), or Methocel (methyl cellulose polymer supplied by Dow Chemical Company) added typically at the concentration level of 0.1 to 1 percent by weight, can result in thinner uniform gel layers than are obtained with unmodified sol.

In addition, the production of thin uniform films is facilitated by the nature of the porous inorganic membrane. In the case of anodic aluminium oxide membranes, the surface is smooth and essentially free of macro-defects and this results in thin uniform defect-free coatings. In the case of the deposition of aqueous boehmite sols onto the asymmetric anodic aluminium oxide membranes, the pore size of the face of the membrane in contact with the sol can be smaller than the crystallite size of the boehmite particles in the sol, with the consequence that little or no intrusion of the sol into the membrane occurs during deposition.

The thin uniform gel films can be formed on the second surface of the anodic oxide membrane by deposition of a concentrated sol followed by air drying. Various techniques including brush, spray, dip, spin coating, electrophoretic and thermophoretic techniques may be used to apply the sol to the membrane. Spray coatings can be applied using an aerosol method. The anodic oxide membrane is suspended vertically to permit excess sol to drain off and spraying is conducted until full coverage of the membrane surface is achieved.

To prepare spin coated composite membranes, the membrane can be attached horizontally to the platen of a commercially available spin coating unit. A known quantity of the concentrated sol is applied to the membrane surface and is permitted to reside thereon for a predetermined period of time typically up to 60 seconds. Excess sol is removed by spinning the coated membrane, typically at a speed from 200 to 2000 rpm. The thickness of the gel film is controlled by the sol concentration and age, the residence time of the sol on the membrane surface, and the spin speed and spin time.

The freshly coated membrane is then heated to transform the gel layer into a microporous refractory film. For example, heating converts a boehmite gel layer into a mechanically stable gamma-$Al_2O_3$ structure. Heating conditions are not critical to the invention and may be conventional, bearing in mind the need to avoid thermal shock which might result in the formation of cracks or pin-holes. A typical heating schedule for a boehmite gel layer might be: (a) heating at 50° C. per hour to 200° C. followed by isothermal treatment at 200° C. for 15 minutes, (b) subsequent heating at 200° C. per hour to 450° C. followed by an isothermal hold for 15 minutes, (c) cooling at 50° C. per hour to room temperature. The first part of the heating schedule up to 200° C. is designed to remove absorbed water; the second stage to 450° C. removes bound water and transforms the gamma-AlOOH to gamma-Al$_2$O$_3$. This transformation occurs at temperatures at or above 390° C. During the heating operation, considerable shrinkage of the film takes place. For films of the thickness with which this invention is concerned, shrinkage is mainly in a direction perpendicular to the plane of the film, i.e. the film gets thinner. For thicker films, shrinkage may be in the plane of the film and may result in cracking.

An advantage of using a membrane having small pores, at least at the surface overlain by the microporous films is that a thin film can bridge the pores without sagging or bursting and without excessive entry of film material into the pores. Membranes with pores having average diameters from 5 to 100 nm are preferred for this reason. However for certain applications it may be preferred to apply the sol/gel layers to the large-pored surface of an asymmetric membrane or even to both sides. It is noted that when the application is made to the large-pored surface, the penetration of the sol is still substantially limited by the restrictive effect of the small pores at the opposite face. Alternatively it is possible to use a membrane, e.g. an anodic aluminium oxide membrane, or a tape-cast membrane, which may have larger pores or may not have been pre-treated with a silicate or other solution, and to achieve complete coverage by a film having the desired microporous structure by two or more successive sol/gel applications. Thus, a first aqueous sol may be applied to the membrane and the resulting gel optionally dried and heated; and a second sol, aqueous or alcoholic, may be applied to the thus-formed gel or microporous film and the resulting gel or gels dried and heated. This technique is particularly suitable for anodic oxide membranes with parallel pores or for the large pore surface of asymmetric membranes. The membrane is completely covered by two superimposed microporous films which may be arranged to have the same or different pore sizes and which should be completely free of cracks and pinholes.

In order to prevent ingress of the colloidal sol (or polymer solution) into the pores of the membrane, it is possible to increase its viscosity. This can be done simply by adding a relatively viscous miscible organic liquid. Thus for example a relatively high boiling relatively viscous polyol such as ethylene glycol or glycerol may be added to an aqueous sol which may thereafter be boiled to remove some or all of the water but without breaking the colloidal dispersion of inorganic material.

In order to prevent the ingress of the colloidal sol (or solution of a polymeric precursor to an inorganic material) into the pores of the membrane, it is possible to increase its viscosity. This can be done simply by adding a relatively viscous miscible organic liquid. Alternatively, a relatively viscous relatively high boiling point liquid, for example a polymer such as polyvinyl alcohol or a polyol such as ethylene glycol or glycerol, may be added to the colloidal sol (or solution of a polymeric precursor) and thereafter boiled to remove some or all of the less viscous liquid but without breaking down the colloidal dispersion or solution of inorganic material.

Figure 2:
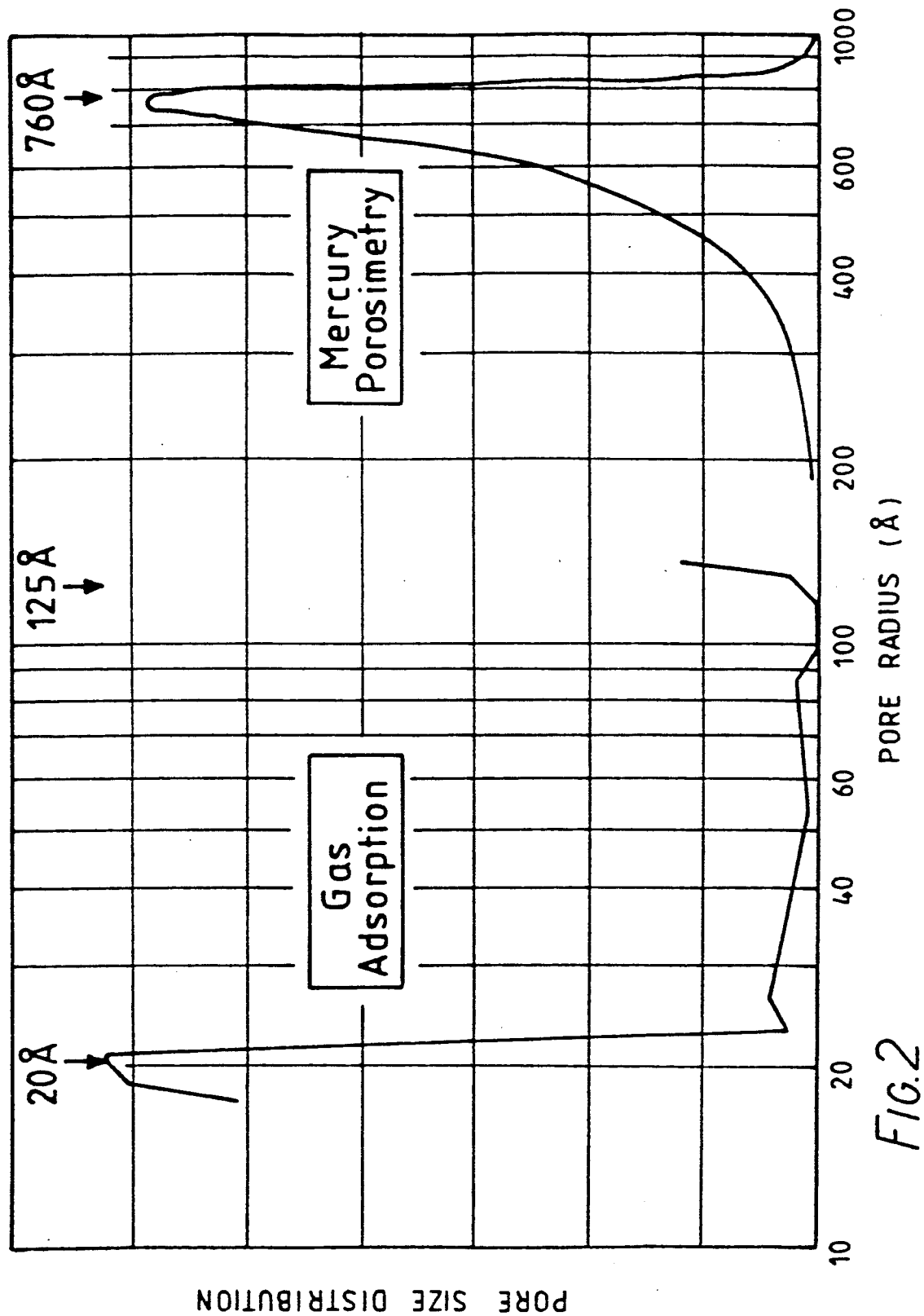

Reference is directed to the accompanying drawings, in which:

FIG. 1 is a schematic cross section through a composite membrane according to one aspect of the invention, and FIG. 2 is a graph of pore size distribution against pore radius.

Referring to FIG. 1, a composite membrane comprises a porous anodic aluminium oxide membrane and a microporous ceramic oxide film 10. The porous membrane is asymmetric by virtue of having a system 12 of larger pores extending in from a first face 14 and a system 16 of smaller pores extending in from a second face 18 the system of larger pores interconnecting at 20 with the system of smaller pores. The figure is not to scale; the anodic oxide film may typically be 30 microns thick while the microporous layer may be 0.3 microns thick.

FIG. 2 shows pore size distributions within the composite ultrafiltration membrane, determined using a combination of multipoint BET gas adsorption isotherms (up to 150 A) and mercury porosimetry (from 200–1000 A). The 12.5 nm (125 A) and 76 nm (760 A) radius pores observed in the figure are from the anodic membrane support. The gamma-alumina film has a narrow pore size distribution with an apparent mean pore radius of about 2 nm. However it is known that the pores are actually slit-shaped rather than cylindrical, as assumed in the BET analysis. Therefore the pore diameter of about 4 nm obtained using BET analysis is larger than the actual slit width (2.7 nm) observed and measured directly using transmission electron microscopy. It is this dimension, the slit width, which determines the performance of the layer in ultrafiltration processes.

EXPERIMENTAL PROCEDURE 1 ALUMINA COATINGS

There follows a description of the preparation and concentration of a boehmite sol.

In a typical experiment, the boehmite sol was prepared by adding aluminium secondary butoxide (1 mole) to deionised water (1.8 l) which was heated to a temperature above 80° C. The mixture was stirred vigorously and maintained at 90° C. One hour after the addition of the alkoxide, nitric acid (0.07 mole) was added to peptize the sol. The sol was kept boiling in an open reactor for about 2 hours to evaporate most of the secondary butanol and then maintained at 90° C. under reflux conditions for a further 16 hours, until a clear transparent sol was obtained.

Some typical properties of the sol were determined to be:

| | |
|---|---|
| Concentration | 29.8 gl$^{-1}$ Al$_2$O$_3$ |
| pH | 4.00 |
| Conductivity | 2.20 mmhos, 21° C. |
| Viscosity | 5 centipoise, 21° C. |

The pH, conductivity and viscosity of the sol remained unchanged over a period of one month when the sol was kept at RT (21° C.).

Boehmite sols so prepared, containing 30 grammes per liter of Al$_2$O$_3$, can be evaporated by heating in air to produce concentrated sols containing up to 190 grammes per liter of Al$_2$O$_3$, or diluted by addition of water to concentration below 10 gl$^{-1}$. The sols can either be used for coating in the freshly concentrated state, or aged to increase their viscosity prior to coating. The room temperature (21° C.) ageing characteristics of a sol concentrated to 62 grammes per liter of Al$_2$O$_3$ over a period of one month were determined to be:

| Age of sol (days) | pH | Conductivity (mmhos) | Viscosity (cp) |
|---|---|---|---|
| 0 | 3.72 | 5.11 | 5 |
| 10 | 3.80 | 4.48 | 6 |
| 20 | 3.83 | 4.70 | 7 |
| 30 | 3.83 | 4.44 | 8 |

All measurements were conducted at 21° C.

The porous membrane used in the following examples was a porous anodic aluminium oxide film as described in EPA 178831. This material has an asymmetric pore structure with a system of larger pores extending in from one face and interconnecting with a system of smaller pores extending in from the other. The membrane was used in the form of sheets 14 cm × 14 cm × 30 microns thick with typical internal dimensions: asymmetric layer thickness about 0.5 microns, average large pore diameter 150 nm, average small pore diameter 25 nm. For Examples 1, 2 and 4 (but not Examples 3 and 5) this membrane was pre-treated by immersion in a saturated (5%) solution of sodium metasilicate, followed by rinsing in distilled water and drying in air.

The following examples illustrate the invention.

EXAMPLE 1

A boehmite sol aged 3 days having a concentration of 62 grammes per liter $Al_2O_3$, viscosity 5 cp (21° C.), and conductivity 5.0 mmhos (21° C.) was deposited on a 14 cm by 14 cm pretreated sheet of the anodic membrane support by spin coating using a sol residence time of 30 seconds, a spin speed of 500 rpm and a spin of 30 seconds. The coated support was heated by a) heating at 50° C. per hour to 200° C. followed by an isothermal hold for one hour, b) heating at 50° C. per hour to 450° C., holding at 450° C. for one hour, and c) cooling at 50° C. per hour to room temperature. This produced a composite ultrafiltration membrane with a uniform gamma-$Al_2O_3$ coating of 0.4 microns thickness, and a permeability for pure water at 110 kPa of 0.010 ml min$^{-1}$ cm$^{-2}$.

EXAMPLE 2

An unaged boehmite sol of concentration 45 grammes per liter, viscosity 5 cp, conductivity 3.22 mmhos (21° C.) was spray coated onto a vertically suspended 14 cm by 14 cm pretreated sheet of the anodic membrane support until full coverage of the support by the sol was achieved. Excess sol was allowed to drain from the support. Heating at 450° C. using the same heating rate as in Example 1 produced a composite ultra-filtration membrane with a coating thickness of 0.3 microns and a permeability for pure water at 110 kPa of 0.014 ml min$^{-1}$ cm$^{-2}$.

EXAMPLE 3

An unaged boehmite sol (5 ml) of concentration 62 grammes per liter $Al_2O_3$, viscosity 5 cp, conductivity 5.1 mmhos, containing <1% octylphenol ethylene oxide condensate was deposited on a 14 cm by 14 cm sheet of the anodic membrane support by spin coating using a sol residence time of 30 seconds, a spin speed of 500 rpm and a spin time of 30 seconds. Heating at 450° C., using the same heating rate as in Example 1, produced a composite ultrafiltration membrane with a thin uniform gamma-$Al_2O_3$ coating of 0.07 microns thickness. This example shows how the use of wetting agents can result in thinner films.

EXAMPLE 4

The flow rates reported in Examples 1–3 were determined as follows. Flow rates for pure distilled and deionised water at pressures up to $2 \times 10^5$ Pa were determined for composite ultrafiltration membranes 25 mm or 43 mm in diameter using an Amicon stirred cell (model 8050). Measurements of flow rates were made twenty minutes after the water feed was pressurised to allow the system to obtain equilibrium. Typical pure water fluxes for a number of other composite membranes according to the invention calcined at 450° C. are given in the following table:

| Sample No. | Film Thickness (microns) | Pore Slit Size (nm) | Flux (ml min$^{-1}$ cm$^{-2}$) at 110 kPa |
|---|---|---|---|
| A | 0.06 | 2.7 | 0.045 |
| B | 0.43 | 2.7 | 0.014 |
| C | 0.28 | 2.7 | 0.026 |

EXPERIMENTAL PROCEDURE 2 TITANIA COATINGS

There follows a description of the preparation of a partially hydrolysed titanium alkoxide derived polymer solution which can be deposited upon a porous refractory support and calcined to result in a microporous film of titania.

In a typical experiment, the polymer solution was prepared by adding titanium isopropoxide (0.012 mole) to 50 cm$^3$ isopropanol under anhydrous conditions at room temperature. Dionised water (0.017 mole) was added to a second 50 cm$^3$ volume of isopropanol at room temperature. The water/alcohol solution was added dropwise while stirring at room temperature to the alkoxide/alcohol solution. Partial hydrolysis and polymerisation of the alkoxide resulted. An acid catalyst, typically $HNO_3$(0.006 mole) was added to the solution to cause peptization. A clear solution resulted, of concentration 10 gl$^{-1}$ of titanium values expressed as $TiO_2$, of viscosity 3 cp (21° C.).

The titanium polymer solution so prepared can be concentrated to greater than 30 gl$^{-1}$ of titanium values expressed as $TiO_2$, but is preferably used for film deposition at a concentration of 10 gl$^{-1}$ of titanium values expressed as $TiO_2$.

The following example illustrates the invention for a titania coating.

EXAMPLE 5

A freshly made polymer solution, having a concentration of 10 gl$^{-1}$ $TiO_2$, and viscosity 3 cp, was deposited on a 14 × 14 cm sheet of the unpretreated anodic aluminium oxide membrane by spin coating. A double coat was applied, each coat involved a residence time of 5 seconds, a spin speed of 500 rpm and a spin of 30 seconds. The membrane was heated as follows:

a) heating at 20° C. per hour to 200° C. followed by an isothermal hold for 10 minutes
b) heating at 50° C. per hour to 400° C., holding at 400° C. for 1 minute and
c) cooling at about 200° C. per hour to room temperature.

This produced a composite ultrafiltration membrane with a uniform $TiO_2$ coating of approximately 0.1 microns thickness and a permeability for pure water at 110 kPa of 0.010 ml.min$^{-1}$ cm$^{-2}$.

EXAMPLE 6

This example shows the beneficial effects that can be obtained by pre-treating the membrane.

Sheets of the anodic membrane support of dimensions 14×14 cm were immersed in various aqueous solutions of 5% by weight sodium metasilicate, 5% by weight pentasodium triphosphate or 5% by weight disodium tetraborate at room temperature for a period of 5 seconds. Following this pretreatment the membrane sheets were rinsed thoroughly in distilled water, dried in air, and subsequently spin coated with boehmite sol of concentration 30 gl$^{-1}$ using a residence time of 5 seconds and a spin speed of 500 rpm. The effectiveness of the pretreatment was monitored by direct visual observation of the degree of gel coverage after coating, since uncoated regions of the membrane exhibited different contrast to coated regions when illuminated by white light. Use of the pretreatments listed in this example resulted in improved gel coverage of the membrane compared with untreated membrane.

EXAMPLE 7

A 14 cm×14 cm sheet of the pretreated anodic membrane was attached to the platten of a commercial spin coating unit and spun at 100 rpm. A boehmite solution of concentration 27.5 gl$^{-1}$ was deposited on the spinning membrane by brush coating, followed by spinning at 500 rpm for 30 seconds. Heating at 450° C. using the same heating schedule as Example 1, produced a composite ultrafiltration membrane with a thin uniform Al$_2$O$_3$ coating. Scanning electron microscopy was used to determine the coating thickness at intervals of 5 mm along a 30 mm long section of the membrane. Over a 20 mm length the thickness varied between 0.13 and 0.14 microns (<8%). Over the remaining 10 mm length the thickness was 0.23 microns, the additional thickness being caused by brush edge effects encounted during brush coating. Oblique angle SEM of the composite ultrafiltration membrane, conducted concurrently with the thickness determinations, revealed no evidence of cracks or pinholds in the coating.

For ultrafiltration, the composite membranes of this invention have the following advantages over prior ceramic oxide materials:

- The flux is significantly higher for equivalent pore sizes. This results from the ability, provided by the fabrication methodology described herein, of being able to apply a uniform very thin gel film. Ceramic oxide film thicknesses are typically a tenth of those described in the prior art.
- They have more uniform thickness and a smoother defect-free surface with absence of major pinholes and cracks. Variations in film thickness are not substantially more than 5% according to this invention compared with 20% in the prior art. This results in reproducible flow rates. Very thin films, down to 0.07 microns or lower, are possible and sol intrusion into the asymmetric side of the anodic membrane support is negligible.

EXAMPLE 8

A pretreated 14×14 cm sheet of the anodic membrane was spin coated with unaged boehmite solution of concentration 45 gl$^{-1}$ at 500 rpm for 30 seconds. Heating at 450° C. resulted in a uniform coating of Al$_2$O$_3$ 0.2 microns in thickness. Scanning electron microscopy of the surface of the coating revealed less than 5 pinholes of size <1 microns in an area 400×100 microns. No pinholes larger than 1 micron in an area were observed. Leenars and co-workers in Journal of Membrane Science 24 (1985) pages 245-260 reported the occurrence of several (<5) pinholes of dimensions greater than 10 microns over a membrane surface area of 10 cm$^3$, but made no statement concerning the occurrence of smaller pinholes.

EXAMPLE 9

165 g of alumina and 0.42 g of magnesia were slurried in a liquid system composed of 78 g trichloroethylene, 32 g of ethanol, 3.8 g of corn oil, 8.4 g of polyvinyl butyral and 14.2 g of polyethylene glycol. The slurry was tape-cast on a glass substrate into a film of width 173 mm, which was dried in air to yield a flexible tape of thickness 0.14 mm. Discs of diameter 26 mm were cut from the tape and partially sintered to produce a porous ceramic material of average pore size 0.3 μm. The discs were pretreated by immersion for 5 seconds in a 5% solution of sodium metasilicate, and subsequently spray coated with a viscous boehmite sol of concentration 15 gl$^{-1}$ in which the water had been replaced by diethylene glycol by adding 100 ml of diethylene glycol to 50 ml of sol at a concentration of 30 gl$^{-1}$ and boiling to evaporate to 100 ml to increase the viscosity. The coated porous substrate was heated for 1 hour at 450° C. to transform the gel layer into a stable γ-Al$_2$O$_3$ film containing pores of slit width 4.2 nm.

An aqueous boehmite sol of concentration 30 gl$^{-1}$ was subsequently deposited upon the first solgel layer by spray coating. This was followed by heating for 1 hour at 450° C., which produced a stable γ-Al$_2$O$_3$ film of pore slit width 2.8 nm. The composite ultra filtration membrane thus formed had a total coating thickness of 1 μm and a pure water flux at 110 kPa of 0.016 ml min$^{-1}$ cm$^{-2}$.

We claim:

1. A composite sheet comprising a porous anodic aluminium oxide membrane and a microporous inorganic film overlying a surface of the membrane, wherein the microporous inorganic film is of substantially uniform pore size and substantially free of cracks and pinholes.

2. A composite sheet as claimed in claim 1, wherein the microporous film is from 0.01 to 2.0 microns thick.

3. A composite sheet as claimed in claim 1, wherein the porous anodic oxide membrane is asymmetric by virtue of having a system of larger pores extending in from a first face and a system of smaller pores extending in from a second face, the system of larger pores interconnecting with the system of smaller pores and the microporous inorganic film overlying the second face.

4. A composite sheet as claimed in claim 3, wherein the membrane has an average pore diameter of 5 to 100 nm at the surface overlain by the film.

5. A composite sheet as claimed in claim 1, wherein the microporous inorganic film is of a metal oxide.

6. A composite sheet as claimed in claim 5, wherein the microporous inorganic film is of gamma-alumina.

7. A composite sheet as claimed in claim 1, wherein the average pore size of the microporous film is from 0.5 to 30 nm.

8. A composite sheet as claimed in claim 1, wherein the microporous film is from 0.03 to 0.5 micron thick.

9. A composite sheet as claimed in claim 1, wherein the porous anodic oxide membrane is asymmetric by virtue of having a system of larger pores extending in from a first face and a system of smaller pores extending in from a second face, the system of larger pores interconnecting with the system of smaller pores, and the microporous inorganic film overlying the first face.

10. A method of making a composite sheet, which method comprises providing a porous anodic aluminium oxide membrane, applying a colloidal sol of an inorganic material or a solution of a polymeric precursor to an inorganic material to a surface thereof so as to form a gel layer thereon and drying and heating the gel to convert it to a microporous inorganic film of substantially uniform pore size and substantially free of cracks and pinholes.

11. A method as claimed in claim 10, wherein the porous anodic aluminium oxide membrane is asymmetric by virtue of having a system of larger pores extending in from a first face and a system of smaller pores extending in from a second face, the system of larger pores interconnecting with the system of smaller pores, the colloidal sol or the solotion being applied to the second face.

12. A method as claimed in claim 10, wherein the colloidal sol is of a refractory metal oxide or the solution is of a polymeric precursor to a metal oxide.

13. A method as claimed in claim 12, wherein the colloidal sol is a boehmite sol obtained by hydrolysis of an aluminum alkoxide.

14. A method as claimed in claim 12, wherein the solution of a polymeric precursor to a metal oxide is a solution obtained by partial hydrolysis of a titanium alkoxide.

15. A method as claimed in claim 10, wherein the colloidal sol or solution contains a surface active agent.

16. A method as claimed in claim 10, wherein the colloidal sol or solution is applied to the porous membrane by an aerosol method.

17. A method as claimed in claim 10, wherein the colloidal sol or solution is applied to the membrane by a spin-coating method.

18. A method of making a composite sheet, which method comprises providing a porous anodic aluminum oxide membrane, pretreating a surface thereof with a solution of a silicate, borate or phosphate, applying to the pretreated surface a colloidal sol of an inorganic material or a solution of a polymeric precursor to an inorganic material so as to form thereon a gel layer, and drying and heating the gel to convert it to a microporous inorganic film of substantially uniform pore size and substantially free of cracks and pinholes.

19. A method as claimed in claim 18, wherein pretreatment is effected by contacting the porous membrane with an aqueous solution of the silicate, borate or phosphate at a concentration of at least 1% by weight and a temperature of 0° to 50° C. for a contact time of from 1 second to 10 minutes.

20. A filter comprising a composite sheet comprising a porous inorganic membrane and a microporous inorganic film overlying a surface of the membrane, wherein the porous inorganic membrane is an anodic aluminum oxide membrane and the microporous inorganic film is of substantially uniform pore size and substantially free of cracks and pin-holes.

21. A method of making a composite sheet, which method comprises providing a porous anodic aluminum oxide membrane and a colloidal sol of an inorganic material or a solution of a polymeric precursor to an inorganic material, increasing the viscosity of the sol or solution by adding a relatively viscous miscible organic liquid.

* * * * *